UNITED STATES PATENT OFFICE.

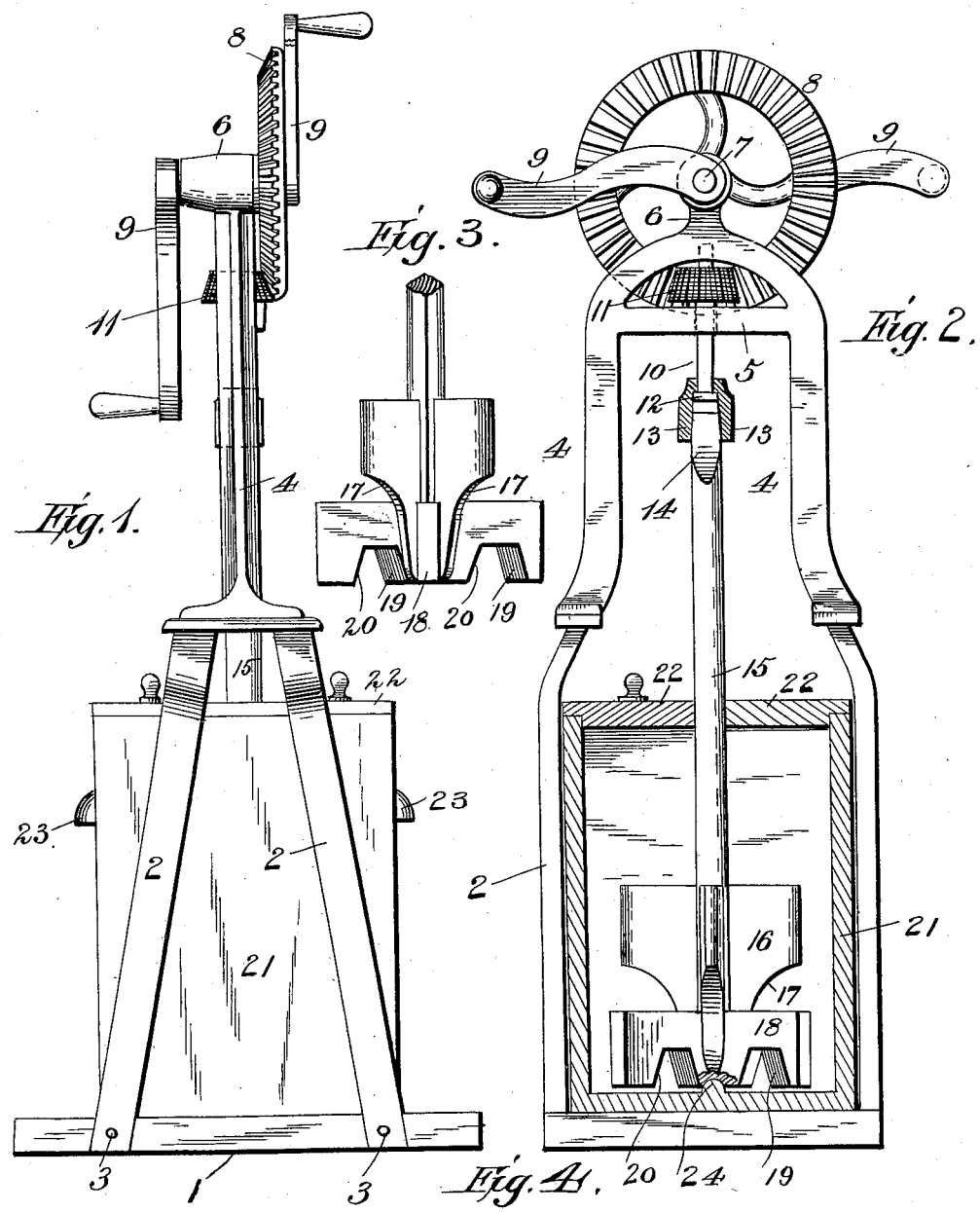

WILLIAM J. GOULD, OF LAWRENCE, KANSAS.

COMBINED CHURN AND BUTTER-WORKER.

SPECIFICATION forming part of Letters Patent No. 633,379, dated September 19, 1899.

Application filed March 18, 1899. Serial No. 709,652. (No model.)

*To all whom it may concern:*

Be it known that I, WILLIAM J. GOULD, a citizen of the United States, residing at Lawrence, in the county of Douglas and State of Kansas, have invented certain new and useful Improvements in a Combined Churn and Butter-Worker; and I do hereby declare the following to be a full, clear, and exact description of the invention, such as will enable others skilled in the art to which it appertains to make and use the same.

My invention relates to certain new and useful improvements in the construction and arrangement of parts necessary to produce a combined churn and butter-worker of reliable efficiency, the object being to enable all of said parts to be readily and cheaply manufactured and assembled in their respective operative positions ready for use.

The essential features of my invention are disclosed in the construction of the dasher and in the means provided for readily taking the dasher out of the body of the churn when for any reason it is desired to do so, as when the cream to be churned is placed within the body portion and when said portion and the dasher are to be cleansed.

The advantages of my invention will be set forth in the following specification and illustrated in the accompanying drawings, in which—

Figure 1 is a side elevation of my improved churn complete. Fig. 2 is an elevation showing the appearance of my churn, taken from a position at right angles to the view shown in Fig. 1. Fig. 3 is a detail side view of my improved dasher, while Fig. 4 is a bottom plan view thereof.

Referring to the several parts of my invention and their coöperating accessories by designating-numerals, 1 represents the base-plate, while 2 indicates standards, which are disposed at each end of the base and preferably permanently attached thereto, as by the bolts or screws 3, said standards extending upward to provide a support for the yoke 4, having the transverse bar 5 and the upward extension or bearing-seat 6, in which is disposed the shaft 7, which carries upon one end the beveled gear 8 and upon each of its extreme ends the operating cranks or handles 9, preferably so mounted on said shaft that they will be in line with each other and extending in opposite directions.

Mounted upon the end of the vertically-disposed shaft 10 is the beveled gear 11, which is designed to mesh with the beveled gear 8 and by which it may be freely rotated in either direction by means of the handles or cranks 9. The shaft 10 terminates in a disk or head 12, and fitting loosely around said shaft, above said head, is the movable coupling 13, the lower end of which is provided with a square hole or recess designed to receive the similarly-shaped end 14 of the rotary dasher 15, and by reference to Fig. 2 it is obvious that all that is necessary to detach said dasher from its connection with the coupling 13 is for the operator to raise said coupling upon the shaft 10, thus separating the dasher 15 therefrom and permitting it to be easily removed.

The lower end of the dasher is provided with a series of blades 16, which may be multiplied in number, as desired, and extend radially outward from said dasher, the lower ends of said blades being so cut away as to provide the inwardly-curved faces 17, and designed to coöperate with said blades 16 are the auxiliary dasher-blades 18, which are provided with recesses or notches, preferably upon their lower edges, said notches being so formed that the upwardly-extending walls thereof are oppositely beveled, thus providing the faces 19 and 20, and it is by this arrangement of the walls of said notches that I am enabled to provide for a great agitation of the cream, and thus alternately direct the same inward and outward and insure a thorough agitation and commingling thereof, which is essential to the concentration of the fatty globules necessary to the production of butter. The said dasher-blades are disposed in their operative position within any suitable form of body, as indicated by the numeral 21, having a suitable closure or lid 22 preferably formed in two sections, each section being provided with a semicircular recess adapted to fit the dasher, as is usual.

Suitable handles 23 may, if deemed desirable, be provided upon each side of the body-section 21, while a suitable recess may be formed in the lower end of the dasher 15, adapted to receive a correspondingly-shaped stud or pin 24, provided in the bottom of the receptacle, thereby insuring that said dasher will be held against lateral movement, though permitted to freely rotate in the performance of its office.

By reference to Fig. 4 it will be seen that I have provided a series of obliquely-disposed notches or recesses 25 upon the bottom edge of the blades 18, the object being to insure a more thorough agitation of the contents of the churn-body, inasmuch as said contents will be alternately forced in opposite directions and by such means violently agitated.

From the foregoing description, considered in connection with the accompanying drawings, it will be seen that I have provided a simple and cheaply-constructed churn adapted for the ready production of butter and for ease of operation, and that the entire churn-body, with its dasher within, may be easily moved from between the standards 2 by raising the coupling 13 sufficiently to disengage the same from the dasher, and that when said coupling is released after the dasher has been removed it will not drop off the end of the shaft 10, but will be held thereon by the head 12.

By means of a peculiar construction set forth for my improved dasher I provide a very valuable appliance by means of which the butter may be worked or freed from water and milk contained therein, as is usual. In order to use my churn as a butter-worker, it may be stated that after the cream has been churned the requisite time to produce the globules forming the butter and after said globules have been gathered into a commingled mass, which rises to the top of the cream, the remaining milk or cream is drawn off through a suitable aperture provided in the body of the churn or otherwise and a desired quantity of water introduced, when by agitating the dasher the butter is thoroughly rinsed, when the water may be withdrawn. The butter is now ready for the addition of the required quantity of salt, when the dashers are moved back and forth or otherwise, as preferred, until the salt has been thoroughly incorporated with the butter and the latter freed from remaining portions of milk and water, when such remaining portion of milk and water may be withdrawn and the butter removed and molded or otherwise disposed, ready for the market.

Believing that the advantages and construction of my invention have been made fully apparent, what I claim as new, and desire to secure by Letters Patent, is—

The herein-described dasher for churns, butter-workers and the like, consisting of a rotatable shaft provided upon its lower end with a series of upper and lower blades, the former being cut away upon their lower edges to provide the curved faces 17 while the latter are provided upon their lower edges with a series of oppositely-disposed oblique notches having the faces 19 and 20 and means to rotate said shaft, as specified and for the purpose set forth.

In testimony whereof I affix my signature in presence of two witnesses.

WILLIAM J. GOULD.

Witnesses:
  JAMES S. WILLEY,
  JOHN M. SPENCER.